United States Patent
Christoff et al.

(10) Patent No.: US 12,050,232 B2
(45) Date of Patent: Jul. 30, 2024

(54) SYSTEMS AND METHODS FOR PROBE TIP HEATING

(71) Applicant: Instrumentation Laboratory Company, Bedford, MA (US)

(72) Inventors: Chris Christoff, Bedford, MA (US); Joshua A. Shreve, Acton, MA (US); Reed Hebert, Bedford, MA (US); Benjamin Newton, Bedford, MA (US)

(73) Assignee: Instrumentation Laboratory Company, Bedford, MA (US)

( * ) Notice: Subject to any disclaimer, the term of this patent is extended or adjusted under 35 U.S.C. 154(b) by 90 days.

(21) Appl. No.: 17/567,041

(22) Filed: Dec. 31, 2021

(65) Prior Publication Data
US 2023/0213543 A1  Jul. 6, 2023

(51) Int. Cl.
*G01N 35/10* (2006.01)
*B01L 7/00* (2006.01)
*G01N 35/00* (2006.01)

(52) U.S. Cl.
CPC ..... *G01N 35/1009* (2013.01); *G01N 35/1002* (2013.01); *B01L 7/525* (2013.01); *G01N 2035/00425* (2013.01)

(58) Field of Classification Search
None
See application file for complete search history.

(56) References Cited

U.S. PATENT DOCUMENTS

| | | |
|---|---|---|
| 6,576,477 B1 | 6/2003 | Tokiwa et al. |
| 6,762,834 B2 | 7/2004 | Komatani et al. |
| 6,872,203 B2 | 3/2005 | Shafirstein et al. |
| 7,314,310 B2 | 1/2008 | Medero |
| 7,850,921 B2 | 12/2010 | Iguchi et al. |
| 8,323,585 B2 | 12/2012 | Heavner |
| 8,337,754 B2 | 12/2012 | Emery et al. |
| 8,393,166 B2 | 3/2013 | Fiedler et al. |
| 8,551,080 B2 | 10/2013 | Ashman et al. |
| 8,672,879 B2 | 3/2014 | Grant et al. |
| 9,005,166 B2 | 4/2015 | Uber, III et al. |
| 9,579,646 B2 | 2/2017 | Richardson |
| 9,821,305 B2 | 11/2017 | Michels et al. |
| 10,039,880 B2 | 8/2018 | Holtwick et al. |
| 10,710,066 B2 | 7/2020 | Chu et al. |
| 10,788,479 B2 | 9/2020 | Makino et al. |
| 11,175,300 B2 | 11/2021 | Park et al. |
| 2002/0124526 A1 | 9/2002 | Lewis, Jr. et al. |

(Continued)

FOREIGN PATENT DOCUMENTS

| | | |
|---|---|---|
| CN | 101806763 A | 8/2010 |
| CN | 110658352 A | 1/2020 |

(Continued)

*Primary Examiner* — P. Kathryn Wright
(74) *Attorney, Agent, or Firm* — ArentFox Schiff LLP

(57) ABSTRACT

Systems and methods for probe tip heating are disclosed. An exemplary system for probe tip heating can include an enclosure enclosing a probe tip, a heating device, and a fan. The probe tip can be configured to access an internal volume of a stoppered container and to aspirate or dispense a material from or to the internal volume of the stoppered container. The heating device can be configured to heat air circulating within the enclosure. The fan can be positioned to circulate air within the enclosure to heat the tip of the probe.

18 Claims, 6 Drawing Sheets

(56) References Cited

U.S. PATENT DOCUMENTS

| | | |
|---|---|---|
| 2004/0166502 A1 | 8/2004 | Lai et al. |
| 2009/0093065 A1 | 4/2009 | Ding et al. |
| 2011/0151482 A1* | 6/2011 | Emery ............. G01N 35/00029 |
| | | 435/7.9 |
| 2018/0267069 A1 | 9/2018 | Katsumi et al. |
| 2019/0018029 A1 | 1/2019 | Muranaka et al. |
| 2020/0018775 A1* | 1/2020 | Fujii ......................... B01L 7/00 |
| 2021/0025908 A1 | 1/2021 | Osawa et al. |
| 2021/0077991 A1 | 3/2021 | Edwards |
| 2021/0101154 A1 | 4/2021 | Dulaff et al. |
| 2021/0190808 A1 | 6/2021 | Meints et al. |
| 2021/0382078 A1* | 12/2021 | Funakoshi ....... G01N 35/00663 |
| 2022/0001380 A1 | 1/2022 | Christ |
| 2022/0187285 A1* | 6/2022 | Yokoyama ....... G01N 33/54326 |

FOREIGN PATENT DOCUMENTS

| | | |
|---|---|---|
| CN | 109172947 B | 2/2021 |
| CN | 112756020 A1 | 5/2021 |
| DE | 10159207 A1 | 6/2003 |
| EP | 1593952 B1 | 4/2009 |
| EP | 3530303 A1 | 8/2019 |
| EP | 2802348 B1 | 10/2020 |
| JP | 2005003610 A | 1/2005 |
| JP | 2009058288 A | 3/2009 |
| JP | 2012159392 A | 8/2012 |
| JP | 2014092427 A | 5/2014 |
| JP | 2019074412 A | 5/2019 |
| WO | WO2017141627 A1 | 8/2017 |
| WO | WO2019123746 A1 | 6/2019 |
| WO | WO2020100643 A1 | 5/2020 |
| WO | WO2020165322 A1 | 8/2020 |

* cited by examiner

SYSTEMS AND METHODS FOR PROBE TIP HEATING

TECHNICAL FIELD

The disclosed embodiments concern automated testing systems configured to transfer reagents or samples.

BACKGROUND

A chemical, fluidical, or biochemical analysis of a sample using a reagent may be performed in a testing container separate from a storage container of the reagent. The testing container may be the same or separate from a preparation container where tests are prepared. For example, reagents can be mixed in the preparation container. An automated testing machine or material preparation machine can be configured to transfer suitable amounts of the reagent from storage container to the testing container or the preparation container. The reagent can be a fluid. The automated testing machine or material preparation machine can include a probe having a probe tip. The probe tip can be extended into the storage container to aspirate reagent and then dispense the reagent into the testing container or the preparation container.

SUMMARY

The disclosed embodiments include a system for heating a probe. The system includes an enclosure. The enclosure encloses a tip of a probe, the tip of the probe configured to access an internal volume of a stoppered container and to aspirate or dispense a material from or to the internal volume of the stoppered container, a heating device, and a fan positioned to circulate air within the enclosure to heat the tip of the probe.

The disclosed embodiments include a method for heating a probe tip of a probe for aspirating and dispensing fluids. The method includes circulating air within an enclosure, using a fan, to contact a heating device and the probe tip of a probe positioned within the enclosure, the probe tip of the probe configured to access an internal volume of a stoppered container and to aspirate or dispense a material from or to the internal volume of the stoppered container.

The disclosed embodiments include a method for transferring fluid using a probe tip. The method includes aspirating fluid into a reservoir of a probe through a probe tip that accesses an internal volume of a stoppered container, the probe positioned within an enclosure. The method further includes translating the probe to a withdrawn position within the enclosure and circulating air within the enclosure to contact the probe tip to heat the probe tip. The method further includes translating the probe to a dispense position within the enclosure and dispensing a portion of the fluid from the reservoir.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated into and constitute a part of this specification, illustrate disclosed embodiments and, together with the description, serve to explain the disclosed embodiments. In the drawings.

DETAILED DESCRIPTION

Figure 1A:
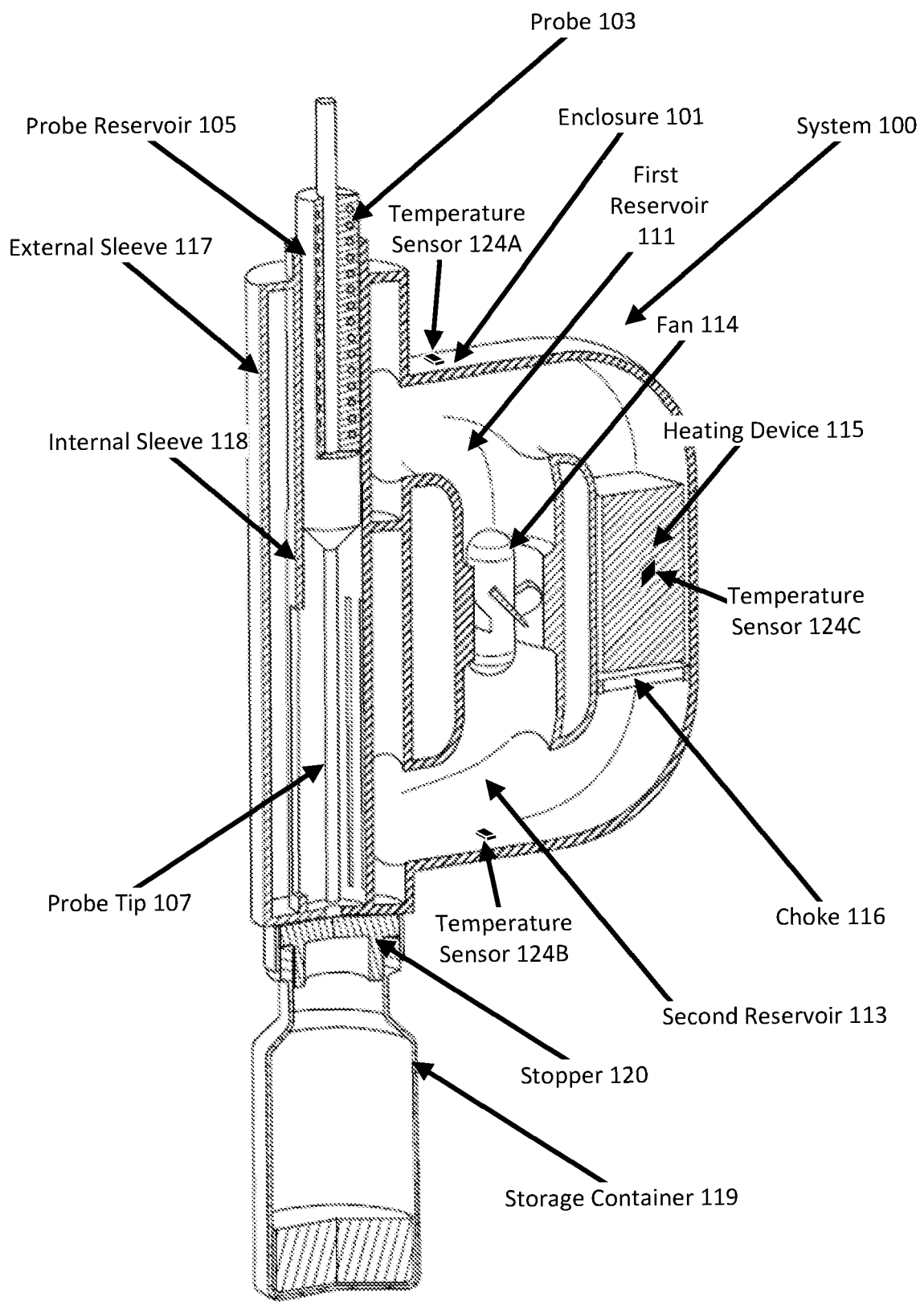
FIG. 1A depicts a profile view of an exemplary system for heating a probe tip, the probe tip being in a withdrawn position, in accordance with disclosed embodiments.

Exemplary embodiments are described with reference to the accompanying drawings. While examples and features of disclosed principles are described herein, modifications, adaptations, and other implementations are possible without departing from the spirit and scope of the disclosed embodiments. Exemplary embodiments described herein may be independent of each other. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It should also be noted that as used herein and in the appended claims, the singular forms "a," "an," and "the" include plural references unless the context clearly dictates otherwise. For convenience, the term "disclosed embodiments" or "exemplary embodiment" may be used herein to refer to a single embodiment or multiple embodiments of the disclosure.

A chemical, fluidical, or biochemical analysis (e.g., an analysis) of a sample using a reagent may be performed in a testing container (e.g., a well, a cuvette, a vial, or the like) separate from a storage container (e.g., a vial, bottle, test-tube, or the like) of the reagent. The testing container may be the same or separate from a preparation container (e.g., a cuvette, a vial, a tube, or the like) where tests are prepared. For example, reagents can be mixed in the preparation container. An automated testing machine or material preparation machine (which can be the same as or separate from the testing machine) can be configured to transfer suitable amounts of the reagent from storage container to the testing container or the preparation container. The reagent can be a fluid. The automated testing machine or material preparation machine can include a probe having a probe tip. The probe tip can be extended into the storage container to aspirate reagent and then dispense the reagent into the testing container or the preparation container. For simplicity of description, the term "machine" is used for the testing or material preparation machine, and "target container" is used for testing container or preparation container.

The analysis may be performed at a temperature greater than a storage temperature of the reagent. For example, the specified temperature for the analysis might be 37° C., while the reagent might be stored at between 4 and 20° C., e.g., 4 to 15° C., or 4 to 8° C. The reagent must therefore be heated before being dispensed into the target container. In some instances, requirements for the analysis may specify that the reagent be dispensed at a specified temperature greater than the reagent's storage temperature.

Conventional machines may use heating elements disposed along probe tip or an upper portion of the probe tip (e.g., electrical restive heating elements attached to the probe tip), or indirect heating of the probe tip (e.g., using a heating cylinder that contacts the probe, thereby indirectly heating the probe tip). In some implementations, such heating elements can be disposed along an upper portion of the probe or probe tip. Such conventional approaches may be suitable for probes configured to access unsealed reagent storage containers. Such probes may not need to penetrate a sealed stopper of a storage container and may have relatively short probe tips (e.g., 6 mm to 8 mm).

Unsealed reagent storage containers, while being compatible with conventional approaches to probe tip heating, can expose stored reagent to the ambient environment, thereby reducing the lifetime of the exposed reagent. Storing reagent in a sealed container can improve the lifetime of the reagent, increasing the reliability of the analysis and reducing reagent wastage. To improve the lifetime of the reagent, a reagent storage container can be sealed with a stopper adapted for repeated penetration by the probe tip. The machine can use a probe tip designed to penetrate a resealable stopper to aspirate the reagent (e.g., a penetrating probe tip).

Penetrating probe tips may be incompatible with conventional approaches to probe tip heating. Forcing a heating element through a resealable stopper may damage the heating element or the resealable stopper. Heating elements therefore may not be placed around or along the portion of the probe tip that penetrates the resealable stopper. This portion of the probe tip may therefore be more difficult to heat directly than a conventional probe tip. Furthermore, the dimensions of penetrating probe tips may differ from the dimensions of conventional probe tips. Penetrating probe tips may be longer than conventional probe tips, as the penetrating probe tips may need to reach the bottom of the sealed storage container while the rest of the probe remains outside the resealable stopper. For example, while conventional probe tips may be 5 to 15 mm in length, penetrating probe tips may be 60 to 80 mm in length. Penetrating probe tips may be thinner than conventional probe tips to reduce damage from repeated penetration to the resealable stopper. Because penetrating probe tips may be longer or thinner than conventional probe tips, penetrating probe tips may be more thermally isolated than conventional probe tips. Because penetrating probe tips are more thermally isolated, indirect heating of penetrating probe tips may be more difficult than indirect heating of conventional probe tips.

Absent effective direct or indirect heating of the probe tip, material may not be dispensed by the probe at the temperature specified for the analysis. Material aspirated into an unheated probe tip may not be heated to the specified temperature. Furthermore, aspirating cold material can chill an unheated probe tip. Dispensing material through the chilled probe tip can chill the dispensed material. Accordingly, even when material is heated to the specified temperature within the probe, aspirating and dispensing material through an unheated probe tip can cause the material to be dispensed below the specified temperature.

Disclosed systems and methods can improve upon conventional designs by controlling the temperature of a penetrating probe tip using convective or conductive heating. Such heating can maintain the probe tip temperature at a desired value or within a desired range by adjusting the temperature or flow of air circulating around the probe tip. This air can be circulated within an enclosure, to reduce the effect of the higher-temperature circulated air on the lower-temperature ambient environment of the stored reagents.

A machine using such an improved temperature control mechanism can perform an analysis using a reagent at a precise, desired temperature, while storing the reagent at a lower temperature in a sealed container. Such a system can perform reliable analyses, while also extending reagent lifetime and reducing the wastage of reagents. Furthermore, the probe tip can be heated in place of heating the target container, accelerating performance of the analysis (e.g., by transferring and heating materials at the same time) and potentially simplifying the machine (e.g., by reducing or eliminating the need for components to heat the target container).

Though described for convenience with regards to reagents, samples (e.g., blood samples, or the like) may also be aspirated by the machine and dispensed into the target container. Such samples may be aspirated from sample storage containers (which may or may not be resealable) and may be dispensed into target containers using the penetrating probe, or another probe adapted for aspirating and dispensing the samples. Such samples may be fluids. In some embodiments, heating may be used to control the temperature of the probe used for aspirating and dispensing the samples. By controlling the temperature of the probe, such heating may control the temperature of the samples. The temperature of the samples may be the same as the temperature used when dispensing the reagent, or may differ. As may be appreciated, the analysis may include multiple reagents, which may be aspirated and dispensed using the same probe, or different probes, and the desired temperatures for the different reagents may be the same, or may differ.

Turning now to the drawings, FIG. 1A depicts an exemplary profile view of an exemplary system 100 for heating a probe tip, the probe tip being in a withdrawn position, in accordance with disclosed embodiments. The exemplary system 100 includes an enclosure 101 and a probe 103. Enclosure 101 can be manufactured using any suitable material (e.g., metal, plastic, or the like). Exemplary system 100 can be part of a larger automatic testing system.

Probe 103 can include a probe reservoir 105 and a probe tip 107. Probe tip 107 can access an internal volume of a storage container to aspirate a material (e.g., a reagent or sample) contained in the container. In some embodiments, probe tip 107 can have an internal lumen in fluidic connection with probe reservoir 105. Through the internal lumen, the aspirated materials can be stored in probe reservoir 105 for transferring. Materials in probe tip 107 or the probe reservoir 105 can be heated. In some embodiments, probe reservoir 105 can be heated (e.g., using conductive heating through a resistive heating element or other suitable heating element that contacts or is disposed within probe 103). In some embodiments, the probe can be made from a corrosion-resistant material, such as stainless steel, a cobalt-nickel steel, or another suitable corrosion-resistant material. In some embodiments, probe reservoir 105 can have a cross-sectional area of 0.5 to 2.0 mm$^2$ (e.g., 1.15 mm$^2$, or another suitable cross-sectional area), a length of 60 to 240 mm (e.g., 120 mm, or another suitable length), and an internal volume (e.g., capacity) of 70 to 280 µL (e.g., 140 µL or another suitable volume). While FIG. 1A depicts probe reservoir 105 as being circular in cross section and coaxial with an internal sleeve space and probe tip 107, the disclosed embodiments are not so limited. Probe reservoir 105 may, in some embodiments, have other cross-sectional shapes. Probe reservoir 105 can connect to a proximal end of probe tip 107. In some embodiments, probe tip 107 and probe reservoir 105 can be formed as a single component. In various embodiments, probe tip 107 and probe reservoir 105 can be formed as separate components and subsequently connected. The disclosed embodiments are not limited to any particular method of forming or connecting probe tip 107 and probe reservoir 105. Probe tip 107 can have a cross-sectional area of 0.15 to 0.6 mm$^2$ (e.g., 0.3 mm$^2$ or another suitable cross-sectional area), a length of 35 to 140 mm (e.g., 76 mm or another suitable length), and an internal volume (e.g., capacity) of 10 to 40 µL (e.g., 22 µL or another suitable volume).

In some embodiments, the probe tip can be heated inside the enclosure 101. Portions of enclosure 101 can form first reservoir 111 and a second reservoir 113. First reservoir 111 and the second reservoir 113 can be separated by a fan 114 and a heating device 115. As depicted in FIG. 1A, fan 114 can be an axial fan (though other fan types may be used) and may have a diameter of 15 to 80 mm (e.g., 38 mm or another suitable diameter). Fan 114 can be configurable to generate a static pressure of 1000 to 4000 pa (e.g., 1700 pa or another suitable static pressure). As may be appreciated, the disclosed embodiments are not limited to fans having such specifications. Fan 114 can be configured to circulate air between the two reservoirs, e.g., from first reservoir 111 into second reservoir 113 or vice versa or in one or more air circulation loops. In some embodiments, fan 114 can be configurable to maintain second reservoir 113 at a higher static pressure than first reservoir 111. The mechanical rotation of the fan can be transformed into air velocity, which can be transformed into a static pressure difference across the fan. Accordingly, air can flow from second reservoir 113 through two circulation loops (e.g., the heating and probe loops described below with regards to FIG. 2) in enclosure 101 and return to first reservoir 111. The amplitude of the pressure difference can depend on the resistance of the two circulation loops. Heating device 115 can be configured to heat air flowing along or through heating device 115. As depicted in FIG. 1A, heating device 115 can be or include a heat sink. Such a heat sink can have dimensions of 38 mm×10 mm×57 mm, though the disclosed embodiments are not limited to heating devices having such dimensions. In some embodiments, heating device 115 can further include a heater thermally connected to the heat sink. The heater can be a flat flexible heater (e.g., a silicon rubber, KAPTON, or think film heater) or a cartridge heater. In some embodiments, the heater can be a resistive electrical heater. In some embodiments, the heater can be a DC heater having a thermal output controllable through pulse width modulation based on one or more thermal sensors disposed on or within enclosure 101 (e.g., on the heat sink). The disclosed embodiments are not limited to any particular type of heating device.

Portions of enclosure 101 can form an external sleeve 117 and an internal sleeve 118. While FIG. 1A depicts external sleeve 117 and internal sleeve 118 having circular cross-sections and being mutually coaxial and coaxial with probe tip 107, the disclosed embodiments are not so limited. External sleeve 117 may or may not be coaxial with internal sleeve 118. External sleeve 117 may have a circular cross-section or may have another cross-sectional shape. Internal sleeve 118 can enclose a plenum (described below with regards to FIG. 2) that allows heated air to circulate around the probe, thereby transferring heat to the probe. External sleeve 117 can provide a path for air to return to the heater and fan after having passed through the internal sleeve 118. Probe 103 can be disposed within this plenum, which can be shaped to enable probe 103 to translate vertically within the plenum. In some embodiments, an inner dimension of internal sleeve 118 can conform to at least a portion of probe 103, preventing or reducing air flow out of enclosure 101 through the top of the plenum. In some embodiments, internal sleeve 118 and external sleeve 117 can form an annular space with openings as described herein. Internal sleeve 118 can enclose (and optionally support) probe 103, while external sleeve 117 can insulate the path of circulating air from the ambient environment. As may be appreciated, the sizes of the sleeves can be chosen to be suitable for accommodating the probe 103 of different sizes. In this exemplary embodiment, external sleeve 117 can have a length of between 150 and 300 mm, or between 200 and 250 mm, and a diameter of between 20 and 35 mm, or between 25 and 32 mm; internal sleeve 118 can have a length of between 100 and 200 mm, or between 140 and 160 mm, and a diameter of between 10 and 25 mm, or between 15 and 20 mm. While FIG. 1A depicts the plenum as being circular in cross section and coaxial with probe 103, the disclosed embodiments are not so limited. The plenum may, in some embodiments, have another cross-sectional shape.

A choke 116 can be positioned below the heating element. Choke 116 can be configured to reduce a flow of air from second reservoir 113 to first reservoir 111 through heating device 115. In some embodiments, choke 116 can be formed as a grille containing louvers, baffles, valves, or other adjustable restrictions on air flow. Choke 116 can be adjustable (e.g., using a slide connected to the louvers or the like) to increase or decrease resistance to the flow of air through choke 116. Given an approximately constant static pressure provided by fan 114, increasing or decreasing the resistance through choke 116 can decrease or increase, respectively, the flow of air through choke 116. As depicted in FIG. 1A, choke 116 can have dimensions corresponding to the dimensions of heating device 115. When heating device 115 includes a heat sink, choke 116 can have an area corresponding to the area of the heat sink. As may be appreciated, the disclosed embodiments are not limited to chokes having such dimensions. In some embodiments, the choke 116 can be a screen, a filter, a constricted region of the enclosure, or some other suitable mechanism for increasing resistance to the air flow from second reservoir 113 to first reservoir 111. The choke 116 may be formed as an integral part of enclosure 101, or may be a separate component. The disclosed embodiments are not limited to any particular composition of the choke. The choke 116 may be formed from metal, plastic, wood, paper, fabric, or any other suitable material. As may be appreciated, the resistance of choke 116, the pressure difference across fan 114, and the airflow through fan 114 can be related (e.g., through a head-flow relationship of fan 114). In some embodiments, the choke 116 can be selected to establish a pressure difference between the first reservoir and the second reservoir when the probe is retraced (as in FIG. 1A), thereby controlling a speed of air directed towards the probe tip through inlets slots, as described herein and depicted in FIG. 3B. In some embodiments, choke 116 can be adjusted to establish a pressure difference across fan 114 such that the airflow through the inlet slots is between 50 and 200 L/min (e.g., approximately 100 L/min, or another suitable value which may depend on other parameters of the machine, such as the temperature of heating device 115). In various embodiments, the choke 116 can be selected to determine the fraction of air that flows through heating device 115 when the probe is retracted. Increasing or decreasing the resistance of choke 116 can decrease or increase, respectively, the fraction of air flowing across the fan that then flows through heating device 115.

FIG. 1A further depicts a storage container 119 contacting enclosure 101. In this example, the machine is configured for the probe tip to advance and access an internal volume of the storage container 119. A stopper 120 of storage container 119 can contact a bottom surface of the enclosure. The bottom surface can include an opening, which can be aligned with probe tip 107. This alignment can enable the probe tip to extend beyond enclosure 101 and into storage container 119. In some embodiments, stopper 120 can obstruct the opening when enclosure 101 contacts storage container 119, preventing or reducing the exchange of air between the interior of enclosure 101 and the ambient environment. In this matter, heating of the ambient environment can be reduced or prevented. In some embodiments, storage container 119 can be shaped similar to reagent containers described in U.S. patent application Ser. No. 17/305,504, filed Jul. 8, 2021 (the '504 application), and incorporated herein by reference in its entirety. Stopper 120 can be shaped similar to resealable stoppers described in the '504 application. Enclosure 101 and storage container 119 can be aligned using alignment systems, methods, and features as described in the '504 application. The stopper can be self-sealing.

Figure 1B:
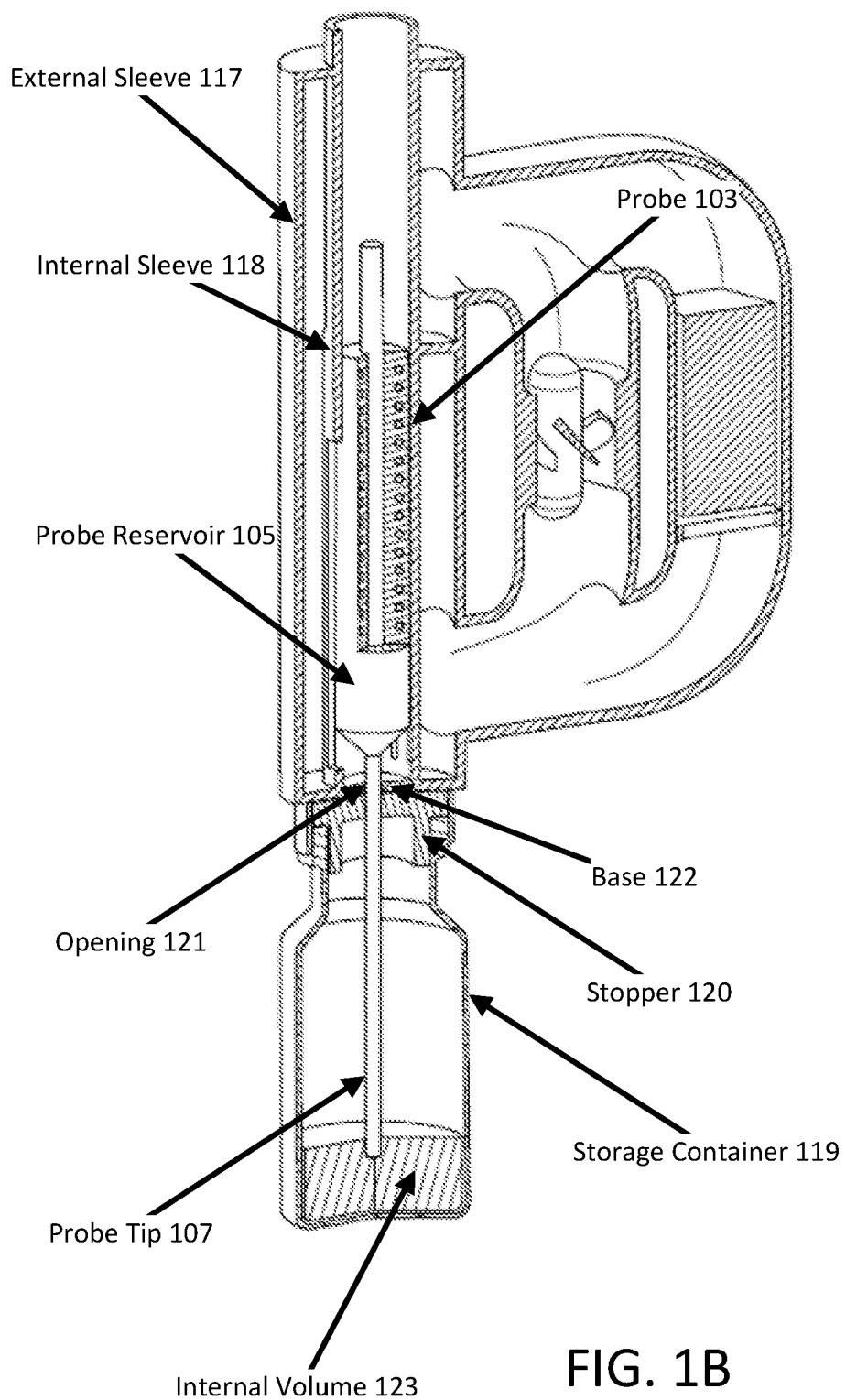
FIG. 1B depicts a profile view of the exemplary system with the probe in the dispense position, in accordance with disclosed embodiments.

As depicted in FIG. 1B, Probe 103 can translate down in the space within internal sleeve 118, causing probe tip 107 to advance through opening 121 of base 122 and penetrate stopper 120. The machine may then aspirate material (e.g., reagent or sample) from internal volume 123 of storage container 119 into probe reservoir 105. In some embodiments, heating of probe tip 107 can be combined with heating of the aspirated material(s) in probe reservoir 105. If probe tip 107 is colder than a specified temperature or temperature range for the analysis, then materials dispensed through probe tip 107 may be colder than the specified temperature or temperature range and the analysis may be faulty.

While FIGS. 1A and 1B depict a single probe tip usable for dispensing both reagents and samples, the disclosed embodiments are not so limited. In some embodiments, the machine may include multiple probe tips. One of the multiple probe tips may be configured to aspirate samples, while another of the multiple probe tips may be configured to aspirate reagents. In some embodiments, a probe tip configured to aspirate reagents may be thinner and have a rounded tip, to avoid tearing or cutting the stopper in the reagent storage container, as described in the '504 application. In some embodiments, the multiple probe tips may be coaxial, with a probe tip configured to aspirate reagents disposed within a probe tip configured to penetrate the seal on a sample storage container. In contrast, in some embodiments the axes of the multiple probe tips may be offset.

Figure 2:
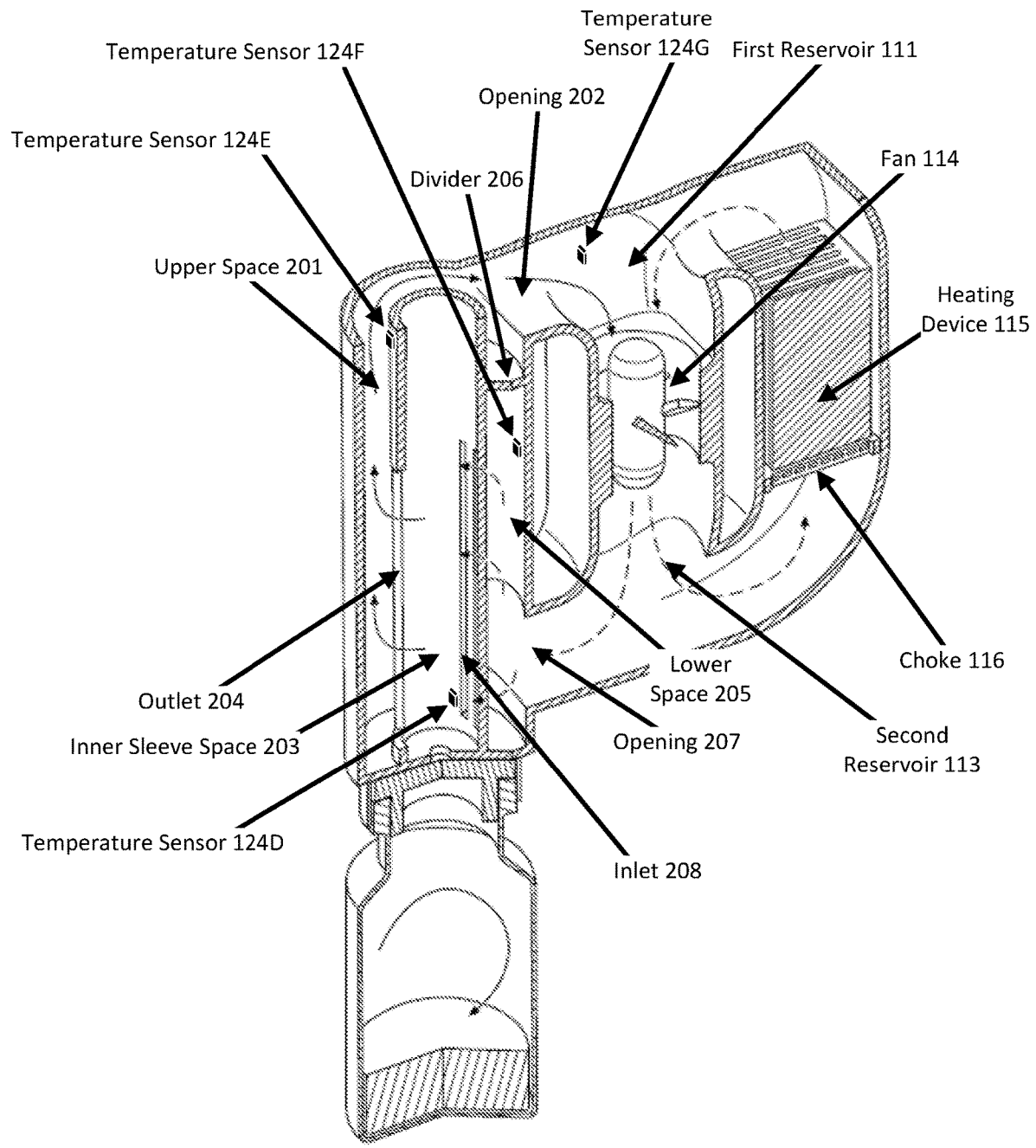
FIG. 2 depicts a cut-away view of an example enclosure and an example storage container with the probe omitted and example air circulation loops shown, in accordance with disclosed embodiments.

FIG. 2 depicts a cut-away view of enclosure 101 and storage container 119. For clarity, probe 103 has been omitted from this view. As depicted in FIG. 2, external sleeve 117 can be spaced apart from internal sleeve 118. An upper space 201 can be formed between external sleeve 117 and internal sleeve 118. Upper space 201 can be connected to first reservoir 111 through opening 202, permitting air to circulate from upper space 201 to first reservoir 111. Upper space 201 can be connected to plenum 203 through outlet 204, permitting air to circulate from plenum 203 to upper space 201. Plenum 203 may be defined above by probe reservoir 105, surrounded by internal sleeve 118, and bounded below by base 122. A lower space 205 can be formed between external sleeve 117 and internal sleeve 118. Lower space 205 and upper space 201 can be separated by a divider 206. Lower space 205 can be connected to through opening 207 to second reservoir 113, permitting air to circulate from second reservoir 113 to lower space 205. Lower space 205 can be connected to plenum 203 through inlet 208, permitting air to circulate from lower space 205 to plenum 203.

As depicted in FIG. 2, enclosure 101 can form a heating loop and a probe loop. In this example, heated air is depicted with dashed arrows, while cooled air is depicted with solid arrows. In the heating loop, air moves from first reservoir 111 through fan 114 to second reservoir 113. The air then flows through choke 116 to heating device 115. The air can be heated or reheated as it passes over or through heating device 115. After leaving heating device 115, the heated air in the heating loop returns to mix with the air in first reservoir 111. In this manner, the air circulating within enclosure 101 can be heated, enabling the circulating air to heat probe tip 107 in turn. In the probe loop, air moves from first reservoir 111 through fan 114 to second reservoir 113. The air then flows through opening 207 into lower space 205. The air passes through inlet 208 into plenum 203 to heat probe tip 107. In some embodiments, as described with regards to FIG. 3B, the inlets can be oriented and configured to focus the air flow onto probe tip 107. The air can flow around and heat probe tip 107. Cooled air can exit through outlet 204 into upper space 201. Cooled air can then return through opening 202 to mix with the air in first reservoir 111.

In some embodiments, as depicted in FIG. 1B, probe reservoir 105 may at least partially obstruct outlet 204 and inlet 208 to plenum 203. Such obstruction may increase the fraction of air passing by fan 114 that passes through heating device 115. The increased fraction of air passing through heating device 115 can increase the rate at which the air temperature in the first and second reservoirs approaches the temperature of heating device 115. In contrast, choke 116 can be selected such that, when probe 103 is retracted, un-obstructing outlet 204 and inlet 208 (as depicted in FIG. 1A), an increased fraction of the air passing by fan 114 passes through inlet 208 into plenum 203, increasing the rate at which probe tip 107 is heated. In some embodiments, when probe 103 is retracted, a majority of the air provided by fan 114 passes through inlet 208 into plenum 203. Such a division of the circulating air can favor heating probe tip 107 over heating the circulating air. In some embodiments, when probe 103 is advanced, a majority of the air provided by fan 114 passes through heating device 115. Such a division of the circulating air can favor heating the circulating air over heating probe tip 107. Accordingly, the machine can automatically favor heating or reheating the circulating air when probe tip 107 is advanced and automatically favor heating or reheating probe tip 107 when probe tip 107 is withdrawn.

Figure 3A:
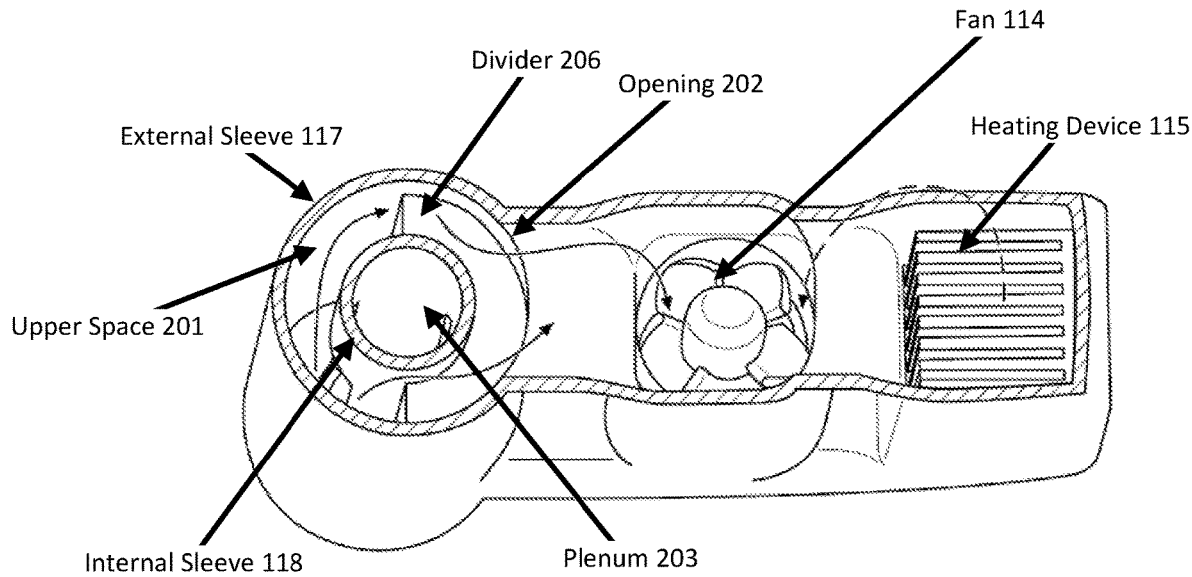
FIG. 3A depicts a cross-sectional view of an example enclosure looking into an example fan, the cross section taken through the low-pressure reservoir, in accordance with disclosed embodiments.

FIG. 3A depicts a view down into enclosure 101 from above, with probe 103 absent. In this example, heated air is depicted with dashed arrows, while cooled air is depicted with solid arrows. In this embodiment, external sleeve 117 and internal sleeve 118 are coaxial, and both have a circular cross-section. As may be appreciated other cross-sections can be used without departing from the envisioned embodiments. Divider 206, as described above with regards to FIG.

2, separates the space between internal sleeve 118 and external sleeve 117 into upper space 201, through which cooled air flows, returning to first reservoir 111 through opening 202, and lower space 205 (not visible in FIG. 3A) through which cooled air flows from second reservoir 113 to plenum 203. In this embodiment, a portion of divider 206 extends across a semi-annular portion of the space between the inner and outer sleeves, forming a top to lower space 205. Heated air also flows from heating device 115 into first reservoir 111. In this manner, air can be recirculated within enclosure 101. Recirculating the air conserves energy and prevents the air from heating the remainder of the machine, which may be configured to operate at a lower temperature (e.g., the reagent storage temperature)

Figure 3B:
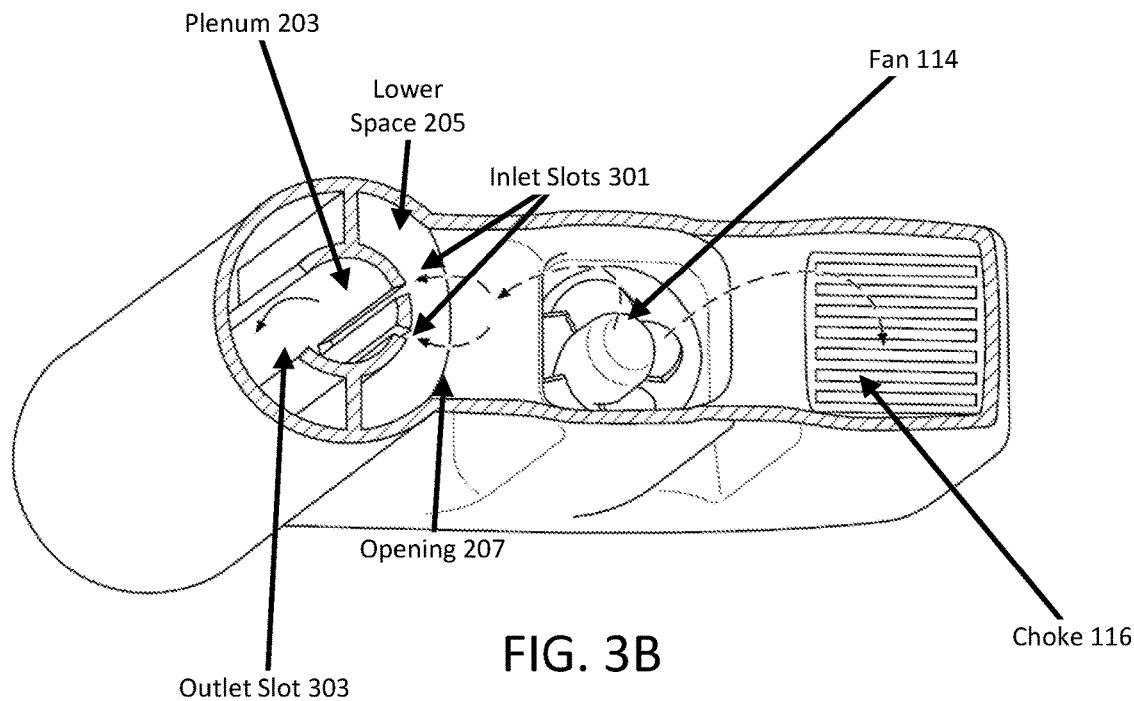
FIG. 3B depicts a cross-sectional view of an example enclosure looking into an example fan, the cross section taken through the high-pressure reservoir, in accordance with disclosed embodiments.

FIG. 3B depicts a view up into enclosure 101 from below, with probe 103 absent. In this example, heated air is depicted with dashed arrows, while cooled air is depicted with solid arrows. In this example, external sleeve 117 and internal sleeve 118 are coaxial, and both have a circular cross-section. As may be appreciated other cross-sections can be used without departing from the envisioned embodiments. Divider 206 separates the space between internal sleeve 118 and external sleeve 117 into upper space 201 and lower space 205. In this embodiment, portions of divider 206 connect with the semi-annular portion of divider 206 depicted in FIG. 3A, forming walls for lower space 205. As may be appreciated, other divider arrangements can be used without departing from the envisioned embodiments. Heated air flows from fan 114 into choke 116 in the heating loop. Heated air also flows through opening 207 into lower space 205, through inlet slots 301 into plenum 203, and through outlet slot 303 into upper space 201 in the probe loop.

As depicted in FIG. 3B, outlet 204 can include an array of outlet slots (e.g., outlet slot 303). The array can include multiple outlet slots distributed vertically or horizontally on internal sleeve 118. An outlet slot can be vertically oriented. In some embodiments, an outlet slot can be parallel to probe tip 107. A horizonal width of an outlet slot can be between 3 and 12 mm, or between 6 and 8 mm, and a vertical height of an outlet slot can be between 40 and 65 mm. While FIG. 3B depicts an outlet 204 including a single outlet slot 303, the disclosed embodiments are not so limited. For example, two outlet slots can be vertically distributed (e.g., one above the other). The disclosed embodiments are not limited to outlet slots. Other mechanisms for controlling and directing a flow of air from plenum 203 to upper space 201 may be used, such as screens, grills, or the like. Such mechanisms can be formed as part of enclosure 101 (e.g., as part of internal sleeve 118), or can be separate components.

As depicted in FIG. 3B, inlet 208 can include an array of inlet slots (e.g., inlet slots 301). The array can include multiple inlet slots distributed vertically or horizontally on internal sleeve 118. An inlet slot can be vertically oriented. In some embodiments, an inlet slot can be parallel to probe tip 107. A horizonal width of an inlet slot can be between 0.5 and 1.2 mm and a vertical height of an inlet slot can be between 40 and 65 mm. While FIG. 3B depicts two inlet slots distributed horizontally, the disclosed embodiments are not so limited. For example, inlet 208 could include two sets of inlet slots, each set including multiple inlet slots distributed vertically (one slot being above another), the sets being distributed horizontally (one set being beside another). The disclosed embodiments are not limited to inlet slots. Other mechanisms for controlling and directing a flow of air from lower space 205 to plenum 203 may be used, such as screens, grills, or the like. Such mechanisms can be formed as part of enclosure 101 (e.g., as part of internal sleeve 118), or can be separate components.

As depicted in FIG. 3B, the inlet slots 301 can be separated by an angle of between 60 and 120 degrees, or by a distance of between 6 and 10 mm. Using multiple inlet slots separated by such angles or distances can prevent formation of a stagnation point in front of the probe tip. Such a stagnation point can reduce the flow of heated air over the probe tip, inhibiting the heating of the probe.

As depicted in FIG. 3B, outlet 204 (and outlet slot 303) can be on an opposite side of internal sleeve 118 from inlet 208 (and inlet slots 301). While FIG. 3B depicts one outlet slot 303 and two inlet slots 301, the number of inlets slots and the number of outlet slots may vary. In some embodiments, an area of the outlet slot(s) can be larger than the sum of the areas of the inlet slots. In some embodiments, outlet slot 303 and inlet slots 301 can have similar heights, but an arc length of outlet slot 303 can be greater than the sum of the arc lengths of inlet slots 301. In some embodiments, the ratio of the outlet slot area to the inlet slot area can be a number between 2 and 30, or between 10 and 20. Such a configuration can ensure that the pressure difference between lower space 205 and the plenum 203 is approximately equal to the pressure difference between second reservoir 113 and first reservoir 111. In this manner, the velocity of air flowing through inlet slots 301 and contacting probe tip 107, for a given fan speed or pressure, can be increased or maximized. Increasing the air speed can increase heat transfer to probe tip 107, reducing the time required to heat or reheat probe tip 107.

Consistent with disclosed embodiments, the machine can use rules (e.g., if-then rules, heuristics, decision trees, or the like), control laws (e.g., proportional, proportional-integral, or proportional-integral-derivative control law, a state-space control law, an adaptive control law, a nonlinear control law, or other suitable control law), or another suitable control framework control the temperature of the probe tip. The control framework can control the temperature of the probe tip to be within a specified temperature range or to approximate a specified temperature value. In some instances, the control framework can control the temperature of the probe tip to be within the specified temperature range (or to approximate the specified temperate value) prior to at least one of aspirating a reagent (e.g., from a storage container, or the like) or dispensing a reagent (e.g., into a target container). In some embodiments, inputs to such a framework can include at least one of the probe tip temperature, an air temperature within the enclosure, a temperature of the heating device, or a current fan speed. In some embodiments, outputs to such a framework can include at least one of the fan speed or the heating device temperature (or instructions to increase or decrease the at least one of the fan speed or the heating device temperature).

While the disclosed embodiments are not limited to any particular control framework (e.g., set of rules, control law, or the like), the machine can, in general, increase a temperature of the probe tip by increasing at least one of the heating device temperature or fan speed. An increase in the fan speed could be continuous, or could be discrete (e.g., turning the fan on, or switching the fan from a lower setting to a higher setting). Likewise, an increase in the temperature of the heating device could be continuous, or could be discrete (e.g., turning the heating device on, or switching the heating device from a lower setting to a higher setting). Similarly, the automatic testing system can, in general, decrease a temperature of the probe tip by decreasing at least one of the heating device temperature or fan speed. In various embodiments, feedforward or feedback control can be used to maintain probe tip 107 at a specified temperature or within a specified temperature range.

In some embodiments, the air temperature within the enclosure can be measured directly (e.g., using one or more temperature sensors within the enclosure, such as temperature sensor 124B, 124C, 124D, 124E, 124F, or 124G). In various embodiments, the air temperature may be measured indirectly. In some embodiments, the air temperature can be estimated from a temperature of the enclosure. For example, a relation can be determined between the temperature of the outer surface of the enclosure and an air temperature within the enclosure. The temperature of the outer surface of the enclosure can be measured using a temperature sensor disposed on the surface of the enclosure (e.g., temperature sensor 124A), or otherwise configured to measure the temperature of the surface of the enclosure.

In some embodiments, the framework used by the machine to control the probe tip temperature can take, as an input, at least one of: the air temperature in first reservoir 111 (e.g., as measured by temperature sensor 124G), the air temperature in second reservoir 113 (e.g., as measured by temperature sensor 124B), the air temperature in upper space 201 (e.g., as measured by temperature sensor 124E), the air temperature in lower space 205 (e.g., as measured by temperature sensor 124F), the air temperature in plenum 203 (e.g., as measured by temperature sensor 124D), or the like. In some embodiments, the framework can use multiple air temperatures as inputs to a control framework.

In some embodiments, the temperature of the heating device can be measured directly (e.g., using a temperature sensor disposed on the heating device, such as temperature sensor 124C), or otherwise configured to measure the temperature of the heating device). The temperature of the heating device can be measured indirectly. For example, the heating device may exhibit a temperature-voltage relationship (or temperature-current relationship). The temperature of the heating device can then be estimated from the applied voltage (or current).

In some embodiments, a speed of the fan can be measured directly. In such embodiments, the fan can provide a voltage or current output indicating a current fan speed. In some embodiments, the speed of the fan can be estimated from a voltage or current applied to the fan.

Consistent with disclosed embodiments, the machine can control the fan speed and the heating device temperature using a second reservoir air temperature and a heating device temperature. These two temperatures could be directly measured using thermal sensors: a temperature sensor disposed within the second reservoir and a temperature sensor disposed on (or part of) the heating device. In some embodiments, the machine can shutdown the heating device when the second reservoir air temperature exceeds an upper threshold and turn on the heating device when the second reservoir air temperature falls below a lower threshold. In some instances, the upper threshold can be between 37 and 42° C., or another suitable threshold, depending on the reagent or the analysis to be performed. In some instances, the lower threshold can be between 30 and 35° C., or another suitable threshold, depending on the reagent or the analysis to be performed.

In some embodiments, inputs to a control framework used by the machine can include at least one a volume of material (e.g., reagent or sample) aspirated, a velocity (e.g., flow rate, or the like) of the aspiration, or a time between the aspiration of the material and the dispensing of the aspirated material. In some embodiments, the time between aspiration of a material and dispensing of the material can be between 1 and 4 seconds. In some embodiments, the temperature of the probe tip following aspiration of cold material can decrease as the duration of reagent aspiration increases. The duration of material aspiration can increase as material aspiration volume increases and decrease as material aspiration velocity increases. In some embodiments, the duration of aspiration or dispensation can be less than a second, or less than 100 milliseconds. Accordingly, the machine can increase, consistent with some control framework, at least one of the fan speed or the temperature of the heating device to compensate for an increase in the volume of the material aspirated, or a decrease in the material aspiration velocity. In some embodiments, the temperature of the probe tip following aspiration of cold material can increase as the time between aspirating the material and dispensing the aspirated material increases. Accordingly, the machine can decrease, consistent with some control framework, at least one of the fan speed or the temperature of the heating device to compensate for an increase in the time between aspirating the material and dispensing the aspirated material.

In some embodiments, inputs to a control framework used by the machine can include at least one of a temperature of the reagent (e.g., storage temperature of the reagent) or an analysis temperature of the analysis. In some embodiments, the analysis temperature of the analysis can be specified by a user of the machine. In various embodiments, the storage temperature of the reagent can be specified by a user of the machine or detected using a temperature sensor of the machine. The disclosed embodiments are not limited to any particular location, type, or configuration of such a sensor. As may be appreciated, the greater the difference in temperature between the storage temperature of the reagent and the analysis temperature of the analysis, the greater the fan speed and/or the higher the heating device temperature.

As may be appreciated, the control framework can be implemented using software, hardware, or a combination of software and hardware. In some embodiments, the automatic control framework can be implemented using software code executed on a general-purpose computer. In various embodiments, the automatic control framework can be implemented using special-purpose hardware or embedded control systems. The disclosed embodiments are not limited to any particular hardware or software implementation of a control framework.

Figure 4:
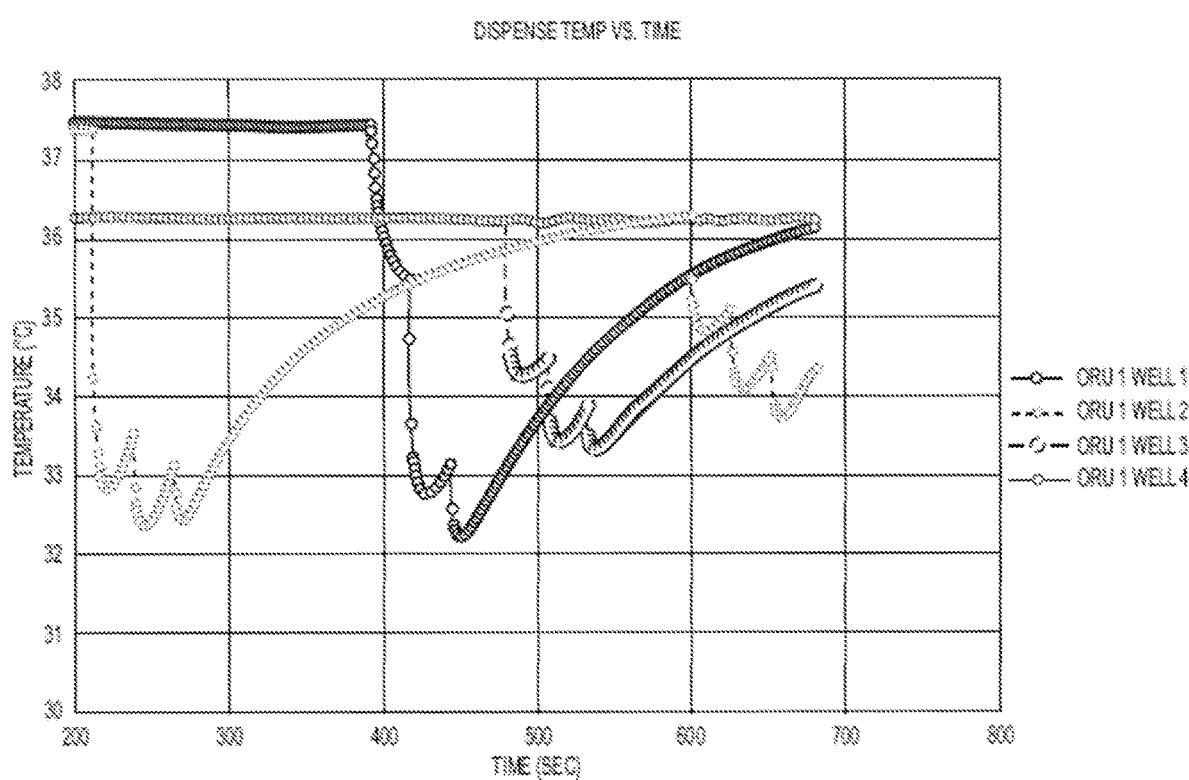
FIG. 4 depicts experimental data showing temperature as a function of time for multiple example storage containers.

FIG. 4 depicts a temperature/time graph showing the temperature of three target containers during the dispensing of reagents. As described herein, reagent may be stored between 4 and 8° C., while the analysis may need to be performed at approximately 37° C. Accordingly, as shown in FIG. 4, the introduction of reagent(s) through an unheated probe tip causes decreases in the temperatures of the wells. The temperature of the target containers increases following dispensation of the reagents because the three target containers are heated. Such decreases in temperature can affect the accuracy of the analysis, while delaying analysis until the target containers are at the specified temperature can reduce the throughput of the machine.

Figure 5:
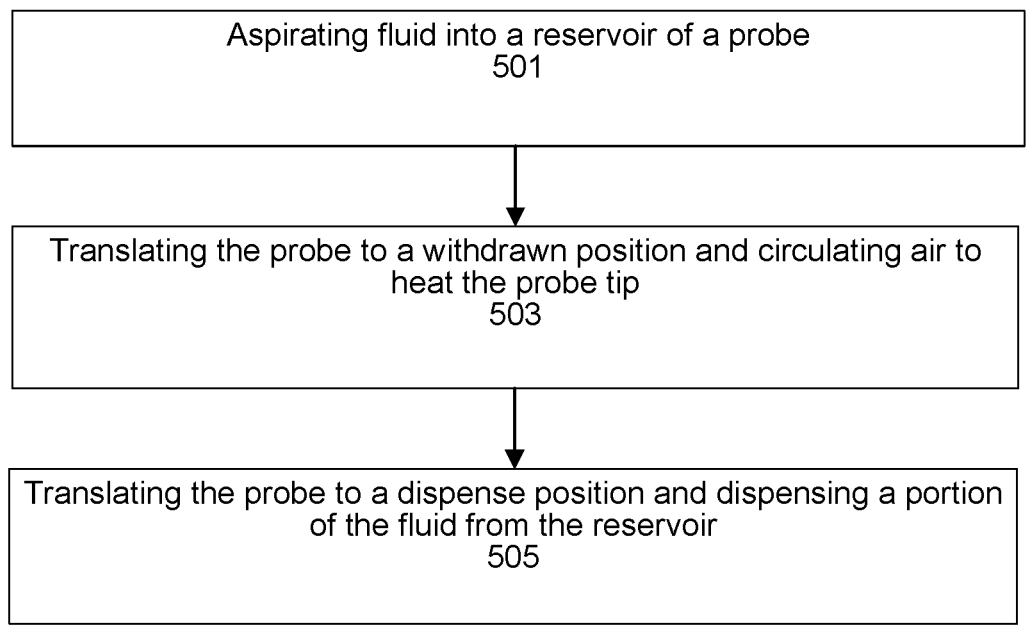
FIG. 5 an exemplary method of aspirating and dispensing a material, in accordance with disclosed embodiments.

FIG. 5 depicts a method 500 of aspirating a material (e.g., a reagent or sample) from a storage container and dispensing the material into a target container. The material can be a fluid. Method 500 can be performed using storage containers and the machine described herein, thereby improving the reliability of analyses, while also extending reagent lifetime and reducing the wastage of reagents.

Prior to performance of method 500, the machine can be initialized. Such initialization can include starting air circulation within an enclosure (e.g., enclosure 101) and bringing the circulating air to a specified temperature. Air circulation can be started by turning on a fan (e.g., fan 114). The circulating air can be brought to a specified temperature by turning on a heating device (e.g., heating device 115).

In step 501 of method 500, the machine can aspirate material (e.g., a reagent or sample) into a reservoir (e.g., probe reservoir 105) of a probe (e.g., probe 103) through a probe tip (e.g., probe tip 107). The probe may be positioned within the enclosure. The enclosure may include the heating device and the fan for circulating heated air. The material may be aspirated from an internal volume (e.g., internal volume 123) of a storage container (e.g., storage container 119). The storage container may be sealed by a stopper (e.g., stopper 120). The machine may advance the probe tip into the storage container through the stopper of the storage container (e.g., as depicted in FIG. 1B). Once the probe tip is positioned within the storage container, the machine can aspirate the fluid.

In step 503 of method 500, the machine can translate the probe to a withdrawn position within the enclosure (e.g., as depicted in FIG. 1A). As described herein, the enclosure can include a heating loop and a probe loop. In some embodiments, the heating loop can include the heating device, while the probe loop can include a lower space (e.g., lower space 205), an inner sleeve space (e.g., plenum 203), and an upper space (e.g., upper space 201). Air can be circulated through the heating loop and a probe loop using the fan. In the probe loop, the circulating heated air can be channeled by inlet slots (e.g., inlet slots 301) to flow across the probe tip.

As discussed herein, the machine can select a fan speed and heating device temperature according to a control framework. The control framework can include at least one input. The at least one input can be an air temperature of the enclosure (or multiple such air temperatures), a temperature of the heating device, a volume of the fluid aspirated, a velocity of aspiration, a time between aspirating the fluid and dispensing the portion of the fluid, a temperature of the material aspirated (e.g., a storage temperature of the reagent or sample), or a desired analysis temperature. In some embodiments, the machine can heat the probe tip to a specified temperature or temperature range using the circulating heated air, consistent with the control framework, prior to dispensing the aspirated fluid into the target container. In some embodiments, as described herein, the probe reservoir can include a heating element, which may additionally heat the aspirated fluid during transfer.

In step 505 of method 500, the machine can translate the probe to a dispense position within the enclosure. In some embodiments, the dispense position may be the same as the aspirate position. In various embodiments, the dispense position may involve a greater or lesser displacement of the probe in the vertical direction than the aspirate position. The machine can then dispense the aspirated fluid from the probe reservoir into the target container. As may be appreciated, when the machine translates the probe to the aspirate or dispense position, the fraction of the air circulating through the heating loop may increase. Conversely, when the machine translates the probe into a withdrawn position, the fraction of the air circulating through the heating loop may decrease.

In some embodiments, the machine may only circulate air when the enclosure is in contact with the storage container (e.g., when the enclosure is in contact with the stopper of the storage container). In this manner, the storage container can prevent or reduce the amount of heated air spilling out of the enclosure. In some embodiments, the machine may additionally or alternatively circulate air when the enclosure is not in contact with the storage container.

In some embodiments, the machine may circulate air prior to aspiration of the material from the storage container in step 501, preheating the probe tip. In various embodiments, the machine may circulate air in step 503 after aspiration of the material and prior to dispensing of the fluid into the storage container.

The embodiments may further be described using the following clauses:

1. A system for heating a probe, comprising: an enclosure enclosing: a tip of a probe, the tip of the probe configured to access an internal volume of a stoppered container and to aspirate or dispense a material from or to the internal volume of the stoppered container; a heating device; and a fan positioned to circulate air within the enclosure to heat the tip of the probe.

2. The system of clause 1, wherein: the enclosure comprises a heating loop and a probe loop; and the fan is positioned to circulate the air within at least one of the heating loop or the probe loop.

3. The system of clause 2, wherein: the heating loop contains the heating device and a choke to restrict airflow through the heating loop.

4. The system of any one of clauses 1 to 3, wherein: the enclosure encloses: a high-pressure location; a low-pressure location, the fan disposed between the high-pressure location and the low-pressure location; and an internal sleeve, the internal sleeve including an inlet connecting the high-pressure location to the internal sleeve.

5. The system of clause 4, wherein: the inlet comprises at least two slots, each of the at least two slots parallel to the probe tip.

6. The system of any one of clauses 4 to 5, wherein: the internal sleeve includes an outlet slot, the outlet slot parallel to the probe tip.

7. The system of any one of clauses 1 to 6, wherein: the system includes at least one of: a temperature sensor configured to measure an air temperature in the enclosure; or a temperature sensor configured to measure a temperature of the heating device.

8. The system of any one of clauses 1 to 7, wherein: the system includes a temperature sensor configured to directly measure an air temperature in either in a high-pressure location of the enclosure or a low-pressure location of the enclosure.

9. The system of any one of clauses 1 to 7, wherein: the system includes a temperature sensor configured to indirectly measure an air temperature or a temperature of the heating device.

10. The system of any one of clauses 1 to 9, wherein: the probe tip comprises a first reagent tip and a second sample tip.

11. A method for heating a probe tip of a probe for aspirating and dispensing fluids, comprising: circulating air within an enclosure, using a fan, to contact a heating device and the probe tip of a probe positioned within the enclosure, the probe tip of the probe configured to access an internal volume of a stoppered container and to aspirate or dispense a material from or to the internal volume of the stoppered container.

12. The method of clause 11 wherein: the enclosure comprises a heating loop and the heating device is disposed within the heating loop; the enclosure comprises a probe loop and the probe is positioned within the probe loop; and circulating the air within the enclosure to contact the heating device and the probe tip comprises circulating the air within the heating loop and the probe loop.

13. The method of any one of clauses 11 to 12, wherein: the enclosure contains a high-pressure reservoir, a low-pressure reservoir, and an internal sleeve; circulating the air within the enclosure comprises circulating a first fraction of the air from the high-pressure reservoir, though the internal sleeve, and into the low-pressure reservoir; and circulating a second fraction of the air from the high-pressure reservoir, past the heating device, and into the low-pressure reservoir.

14. The method of clause 13, the method further comprising: adjusting a temperature of the heating device based on at least one of: an air temperature measurement for the high-pressure reservoir; or a temperature of the heating device.

15. The method of any one of clauses 13 to 14, wherein: circulating the first fraction of the air though the internal sleeve comprises circulating the first fraction of the air though input slots configured to direct the first fraction of the air onto the probe tip.

16. A method for transferring fluid using a probe tip, comprising: aspirating fluid into a reservoir of a probe through a probe tip that accesses an internal volume of a stoppered container, the probe positioned within an enclosure; translating the probe to a withdrawn position within the enclosure and circulating air within the enclosure to contact the probe tip to heat the probe tip; and translating the probe to a dispense position within the enclosure and dispensing a portion of the fluid from the reservoir.

17. The method of clause 16, wherein: the enclosure comprises a heating loop and a probe loop; circulating the air within the enclosure to contact the probe tip comprises circulating the air through the probe loop using a fan; and the method further includes circulating the air through the heating loop to contact a heating device using the fan.

18. The method of clause 17, wherein: a fraction of the air circulating through the heating loop increases when the probe is translated to the dispense position.

19. The method of any one of clauses 17 to 18, wherein: the method further comprises controlling at least one of a temperature of the heating device or a speed of the fan to heat the probe tip to a temperature within a specified temperature range prior to dispensing the portion of the fluid from the reservoir or prior to aspirating the fluid from a container.

20. The method of any one of clauses 17 to 19, wherein: the method further comprises controlling at least one of a temperature of the heating device or a speed of the fan based on at least one of: a volume of the fluid aspirated; a velocity of aspiration; or a time between aspirating the fluid and dispensing the portion of the fluid.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as example only, with a true scope and spirit being indicated by the following claims and their full scope of equivalents.

What is claimed is:

1. A system for heating a probe, comprising:
an enclosure containing, in part, a heating loop and a probe loop, the enclosure enclosing:
  a tip of a probe, the tip of the probe configured to access an internal volume of a stoppered container and to aspirate or dispense a material from or to the internal volume of the stoppered container;
  a heating device within the heating loop; and
  a fan positioned to circulate air:
    within the heating loop contained in the enclosure to heat the air; and
    within the probe loop contained in the enclosure to heat the tip of the probe.

2. The system of claim 1, wherein:
the heating loop contains a choke to restrict airflow through the heating loop.

3. The system of claim 1, wherein:
the enclosure encloses:
  a high-pressure location;
  a low-pressure location, the fan disposed between the high-pressure location and the low-pressure location; and
  an internal sleeve included in the probe loop, the internal sleeve including an inlet connecting the high-pressure location to the internal sleeve.

4. The system of claim 3, wherein:
the inlet comprises at least two slots, each of the at least two slots parallel to the probe tip.

5. The system of claim 3, wherein:
the internal sleeve includes an outlet slot, the outlet slot parallel to the probe tip.

6. The system of claim 1, wherein:
the system includes at least one of:
  a temperature sensor configured to measure an air temperature in the enclosure; or
  a temperature sensor configured to measure a temperature of the heating device.

7. The system of claim 1, wherein:
the system includes a temperature sensor configured to directly measure an air temperature in either in a high-pressure location of the enclosure or a low-pressure location of the enclosure.

8. The system of claim 1, wherein:
the system includes a temperature sensor configured to indirectly measure an air temperature or a temperature of the heating device.

9. The system of claim 1 wherein:
the probe tip is configured to aspirate reagents and the enclosure further encloses a second tip of a second probe configured to aspirate samples.

10. A method for heating a probe tip of a probe for aspirating and dispensing fluids, comprising:
circulating air, using a fan contained in an enclosure, within a heating loop contained in the enclosure to contact a heating device and within a probe loop contained in the enclosure to contact the probe tip of a probe positioned within the enclosure, the probe tip of the probe configured to access an internal volume of a stoppered container and to aspirate or dispense a material from or to the internal volume of the stoppered container.

11. The method of claim 10, wherein:
the enclosure contains a high-pressure reservoir, a low-pressure reservoir, and an internal sleeve;

circulating the air within the enclosure comprises circulating a first fraction of the air from the high-pressure reservoir, though the internal sleeve, and into the low-pressure reservoir; and circulating a second fraction of the air from the high-pressure reservoir, past the heating device, and into the low-pressure reservoir.

12. The method of claim 11, the method further comprising:
adjusting a temperature of the heating device based on at least one of:
an air temperature measurement for the high-pressure reservoir; or
a temperature of the heating device.

13. The method of claim 11, wherein:
circulating the first fraction of the air though the internal sleeve comprises circulating the first fraction of the air though input slots configured to direct the first fraction of the air onto the probe tip.

14. A method for transferring fluid using a probe tip, comprising:
aspirating fluid into a reservoir of a probe through a probe tip that accesses an internal volume of a stoppered container, the probe positioned within an enclosure containing a probe loop and a heating loop;
translating the probe to a withdrawn position within the enclosure and circulating air within the probe loop contained in the enclosure, using a fan contained in the enclosure, to contact the probe tip to heat the probe tip; and
translating the probe to a dispense position within the enclosure and dispensing a portion of the fluid from the reservoir.

15. The method of claim 14, wherein:
the method further includes circulating the air through the heating loop contained in the enclosure to contact a heating device using the fan.

16. The method of claim 15, wherein:
a fraction of the air circulating through the heating loop increases when the probe is translated to the dispense position.

17. The method of claim 15, wherein:
the method further comprises controlling at least one of a temperature of the heating device or a speed of the fan to heat the probe tip to a temperature within a specified temperature range prior to dispensing the portion of the fluid from the reservoir or prior to aspirating the fluid from a container.

18. The method of claim 15, wherein:
the method further comprises controlling at least one of a temperature of the heating device or a speed of the fan based on at least one of:
a volume of the fluid aspirated;
a velocity of aspiration; or
a time between aspirating the fluid and dispensing the portion of the fluid.

* * * * *